US008510784B2

(12) United States Patent
Fukuda et al.

(10) Patent No.: US 8,510,784 B2
(45) Date of Patent: Aug. 13, 2013

(54) INFORMATION PROCESSING APPARATUS, CONTENT REPRODUCTION APPARATUS, INFORMATION PROVIDING APPARATUS, DEVICE CONTROL APPARATUS, COOPERATIVE PROCESSING SYSTEM, AND PROGRAM

(75) Inventors: Kazuhiro Fukuda, Kanagawa (JP); Kazuto Mugura, Tokyo (JP); Nariaki Satoh, Kanagawa (JP); Ippei Tambata, Kanagawa (JP); Goro Takaki, Kanagawa (JP); Rui Yamagami, Kanagawa (JP)

(73) Assignees: Sony Ericsson Mobile Communications Japan, Inc. (JP); Sony Corporation (JP)

( * ) Notice: Subject to any disclaimer, the term of this patent is extended or adjusted under 35 U.S.C. 154(b) by 1170 days.

(21) Appl. No.: 12/381,517

(22) Filed: Mar. 12, 2009

(65) Prior Publication Data

US 2009/0235302 A1 Sep. 17, 2009

(30) Foreign Application Priority Data

Mar. 14, 2008 (JP) .................. P2008-066868

(51) Int. Cl.
*H04N 7/173* (2006.01)
(52) U.S. Cl.
USPC ............ 725/115; 725/39; 725/131; 713/155; 713/168; 715/780
(58) Field of Classification Search
USPC ....................................... 725/115, 131, 39, 50
See application file for complete search history.

(56) References Cited

U.S. PATENT DOCUMENTS

| 2005/0028198 A1* | 2/2005 | Robbins ........................ 725/39 |
| 2005/0108519 A1* | 5/2005 | Barton et al. .................. 713/155 |
| 2008/0216145 A1* | 9/2008 | Barton et al. .................. 725/131 |
| 2009/0228825 A1* | 9/2009 | Van Os et al. ................. 715/780 |
| 2011/0161669 A1* | 6/2011 | Eto ................................ 713/168 |

FOREIGN PATENT DOCUMENTS

| JP | 2007300214 A | 11/2007 |
| JP | 2007318185 A | 12/2007 |
| JP | 2007324845 A | 12/2007 |

OTHER PUBLICATIONS

Office Action from Japanese Application No. 2008-066868, dated Oct. 2, 2012.

* cited by examiner

*Primary Examiner* — Vivek Srivastava
*Assistant Examiner* — Anthony Bantamoi
(74) *Attorney, Agent, or Firm* — Lerner, David, Littenberg, Krumholz & Mentlik, LLP

(57) ABSTRACT

In a cooperative processing system for performing cooperative process between a portable terminal and a television terminal through a service server and a device control server, content and content information separately managed by a content server connected to the television terminal and the service server are searched based on a search condition extracted from the content or the content information reproduced and displayed by the portable terminal, and the search result of the content and the content information is seamlessly displayed on the television terminal. Consequently, the convenience of the user in content usage can be enhanced.

2 Claims, 13 Drawing Sheets

INFORMATION PROCESSING APPARATUS, CONTENT REPRODUCTION APPARATUS, INFORMATION PROVIDING APPARATUS, DEVICE CONTROL APPARATUS, COOPERATIVE PROCESSING SYSTEM, AND PROGRAM

CROSS REFERENCES TO RELATED APPLICATIONS

The present application claims priority from Japanese Patent Application No. JP 2008-066868, filed in the Japanese Patent Office on Mar. 14, 2008, the entire content of which is incorporated herein by reference.

BACKGROUND OF THE INVENTION

1. Field of the Invention

The present invention relates to an information processing apparatus, a content reproduction apparatus, an information providing apparatus, a device control apparatus, a cooperative processing system, and a program.

2. Description of the Related Art

In recent years, a content provider provides various contents using broadcast service, communication service, broadcast communication service and the like. On the other hand, the user acquires and uses contents using various content receiving terminals such as television terminal, personal computer, STB (Set Top Box), PVR (Personal Video Receiver), and portable telephone.

Among the content receiving terminals, the information processing devices such as portable telephone and PDA (Personal Digital Assistance) are being used as highly convenient tools due to their excellent search and browse function. Furthermore, the content reproduction device such as a television terminal of the content receiving terminals is being used as a highly convenient tool due to its excellent reproduction and display function.

SUMMARY OF THE INVENTION

However, in the related art, attempts to further enhance the convenience of the user by taking advantage of the characteristics of every content receiving terminal may not be said as being sufficiently carried out among the content receiving terminals such as the information processing device and the content reproduction device.

For instance, the user may comfortably search and browse through the content irrespective of time and place by using the information processing device, but may not be able to view the content under excellent reproduction and display function. On the other hand, the user may view the content under excellent reproduction and display function by using the content reproduction device, but may not be able to comfortably search and browse through the content irrespective of time and place.

The user uses the information processing device to generally acquire and use content and content information from a content server available to general users operation managed by a content provider. On the other hand, the user sometimes uses the content reproduction device to acquire and use content and content information from a content server available to a specific user such as home server and PVR managed by the user.

In this case, the user separately uses the content and the content information acquired from the content server available to the general user, and the content and the content information acquired from the content server available to a specific user. In such case, the user uses the information processing device and the content reproduction device to separately search and acquire the content and the content information and then separately views the same, and thus the convenience of the user in time of content usage is not necessarily high.

It is desirable to provide a information processing apparatus, a content reproduction apparatus, an information providing apparatus, a device control apparatus, a cooperative processing system and a program capable of enhancing the convenience of the user in time of content usage.

According to a first embodiment of the present invention, there is provided an information processing apparatus in a cooperative processing system, including an information processing apparatus, an information providing apparatus, a device control apparatus, and a content reproduction apparatus connectable through a communication network, for performing a cooperative process between the information processing apparatus and the content reproduction apparatus through the information providing apparatus storing a device control ID in association with a terminal ID unique to the information processing apparatus, and the device control apparatus storing a device ID of the content reproduction apparatus in association with the device control ID. The information providing apparatus and the content reproduction apparatus are respectively connectable to first and second content providing devices capable of extracting and providing content and content information adapted to a search condition. The information processing apparatus includes a reproduction and display unit for reproducing and displaying the content and the content information; a search condition extraction unit for extracting information that becomes the search condition from the content information attached to the content reproduced and displayed by the reproduction and display unit, or the content information being reproduced and displayed; and a processing request transmission unit for transmitting to the information providing apparatus, along with the terminal ID of the information processing apparatus and the search condition, a processing request of a search process for causing the information providing apparatus and the content reproduction apparatus to acquire content and/or content information adapted to the search condition respectively from the first and the second content providing devices and display on the content reproduction apparatus.

According to such configuration, the information processing apparatus performs the search process of the content and the content information in cooperation with the content reproduction apparatus, thereby seamlessly displaying the search result of the content and/or the content information managed by every content providing device on the content reproduction apparatus.

According to a second embodiment of the present invention, there is provided a content reproduction apparatus in a cooperative processing system, including an information processing apparatus, an information providing apparatus, a device control apparatus, and a content reproduction apparatus connectable through a communication network, for performing a cooperative process between the information processing apparatus and the content reproduction apparatus through the information providing apparatus storing a device control ID in association with a terminal ID unique to the information processing apparatus, and the device control apparatus storing a device ID of the content reproduction apparatus in association with the device control ID. The information providing apparatus and the content reproduction apparatus are respectively connectable to first and second content providing devices capable of extracting and providing content adapted to a search condition. The content reproduction apparatus includes a reproduction and display unit for reproducing and displaying the content and content information; a processing request reception unit for receiving from the information providing apparatus, along with the search condition extracted from information reproduced and displayed by the information processing apparatus, a processing request of a search process for causing the information providing apparatus and the content reproduction apparatus to acquire content and/or content information adapted to the search condition respectively from the first and the second content providing devices and display on the content reproduction apparatus; and a processing unit for acquiring the content and/or the content information adapted to the search condition from the information providing apparatus and the second content providing device based on the processing request received from the information providing apparatus, and displaying on the reproduction and display unit.

According to such configuration, the content reproduction apparatus performs the search process of the content and the content information in cooperation with the information processing apparatus, and thereby seamlessly displaying the search result of the content and/or the content information managed by every content providing device.

According to a third embodiment of the present invention, there is provided an information providing apparatus in a cooperative processing system, including an information processing apparatus, an information providing apparatus, a device control apparatus, and a content reproduction apparatus connectable through a communication network, for performing a cooperative process between the information processing apparatus and the content reproduction apparatus through the information providing apparatus storing a device control ID in association with a terminal ID unique to the information processing apparatus, and the device control apparatus storing a device ID of the content reproduction apparatus in association with the device control ID. The information providing apparatus and the content reproduction apparatus are respectively connectable to first and second content providing devices capable of extracting and providing content and content information adapted to a search condition. The information providing apparatus includes a processing request reception unit for receiving from the information processing apparatus, along with the terminal ID of the information processing apparatus and the search condition extracted from information reproduced and displayed by the information processing apparatus, a processing request of a search process for causing the information providing apparatus and the content reproduction apparatus to acquire content and/or content information adapted to the search condition respectively from the first and the second content providing devices, and the content reproduction apparatus to display; a device control ID extraction unit for extracting the device control ID stored in association with the terminal ID based on the terminal ID; a device information transmission/reception unit for transmitting the device control ID to the device control apparatus, and receiving an access destination of the content reproduction apparatus stored in association with the device control ID from the device control apparatus; a processing request transmission unit for transmitting to the content reproduction apparatus the processing request of the search process along with the search condition based on the access destination of the content reproduction apparatus; a content transmission unit for transmitting the content and/or the content information to the content reproduction apparatus; and a processing unit for acquiring the content and/or the content information adapted to the search condition from the first content providing device based on the processing request received from the information processing apparatus, and causing the content transmission unit to transmit the content and/or the content information to the content reproduction apparatus.

According to such configuration, the information providing apparatus causes the information processing apparatus and the content reproduction apparatus to perform the search process of the content and the content information in cooperation, and the content reproduction apparatus to seamlessly display the search result of the content and/or the content information managed by every content providing device.

According to a fourth embodiment of the present invention, there is provided a device control apparatus in a cooperative processing system, including an information processing apparatus, an information providing apparatus, a device control apparatus, and a content reproduction apparatus connectable through a communication network, for performing a cooperative process between the information processing apparatus and the content reproduction apparatus through the information providing apparatus storing a device control ID in association with a terminal ID unique to the information processing apparatus, and the device control apparatus storing a device ID of the content reproduction apparatus in association with the device control ID. The device control apparatus includes a device control ID reception unit for receiving the device control ID stored in association with the terminal ID of the information processing apparatus from the information providing apparatus; a device ID extraction unit for extracting the device ID stored in association with the device control ID based on the device control ID; and a device information transmission unit for transmitting an access destination of the content reproduction apparatus stored in association with the device ID to the information providing apparatus based on the device ID.

According to such configuration, the device control apparatus causes the information processing apparatus and the content reproduction apparatus to perform various processing in cooperation, in cooperation with the information providing apparatus.

According to a fifth embodiment of the present invention, there is provided a cooperative processing system including the information processing apparatus according to the first embodiment, the content reproduction apparatus according to the second embodiment, the information providing apparatus according to the third embodiment, and the device control apparatus according to the fourth embodiment.

According to such configuration, the cooperative processing system enables the user to seamlessly browse the search result of the content and/or the content information managed by every content providing device by cooperatively performing the search process of the content and the content information by the information processing apparatus and the content reproduction apparatus.

According to a sixth embodiment of the present invention, there is provided a program for causing the information processing apparatus according to the first embodiment to execute an information processing method. According to a seventh embodiment of the present invention, there is provided a program for causing the content reproduction apparatus according to the second embodiment to execute an information processing method.

According to the embodiments of the present invention, n information processing apparatus, a content reproduction apparatus, an information providing apparatus, a device control apparatus, and a cooperative processing system, and a program capable of enhancing the convenience of the user in time of content usage can be provided.

DETAILED DESCRIPTION OF THE PREFERRED EMBODIMENTS

Figure 1:
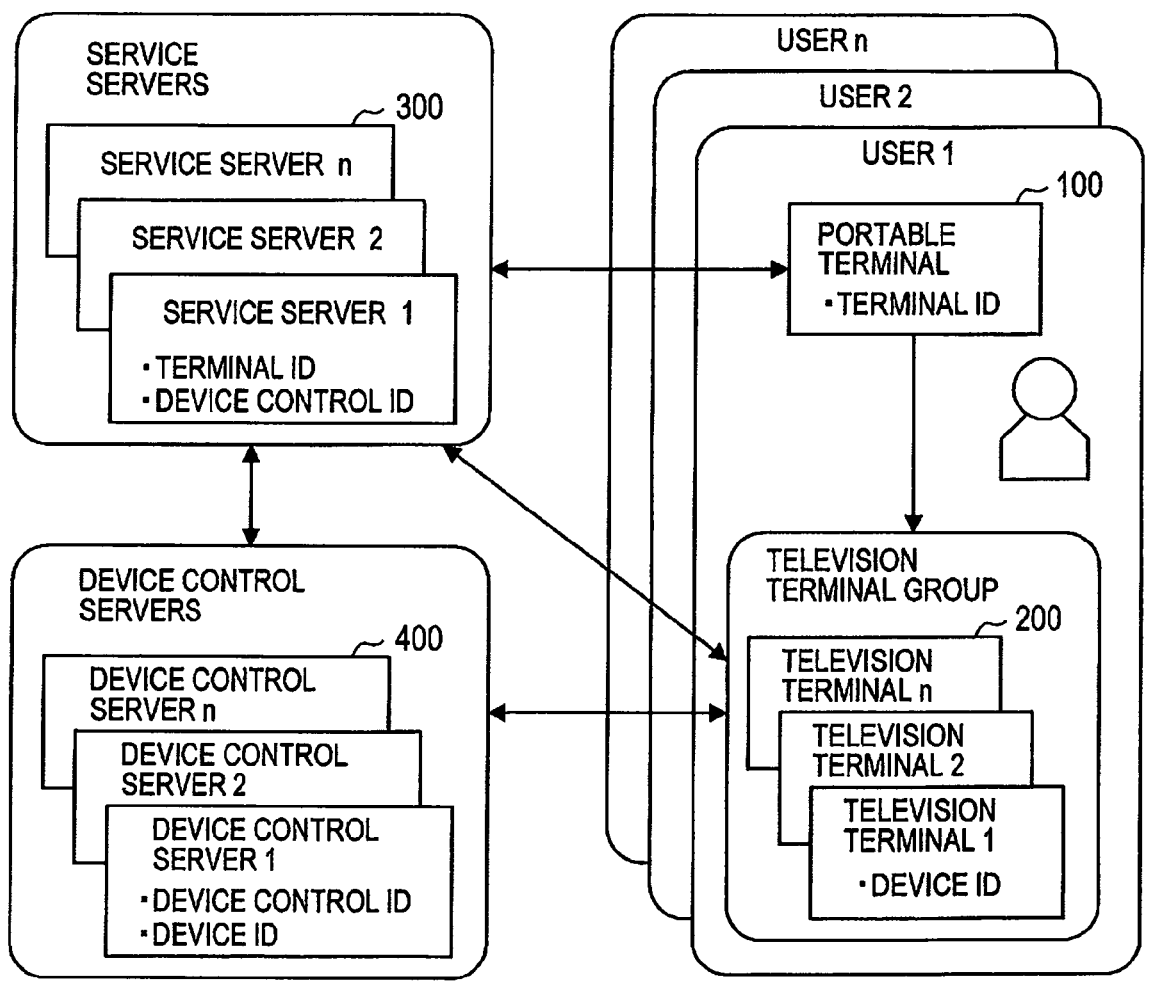
FIG. 1 is a view conceptually showing a cooperative processing system according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Concept of Cooperative Processing System)

FIG. 1 is a view conceptually showing a cooperative processing system according to an embodiment of the present invention. As shown in FIG. 1, the cooperative processing system is configured to include a portable terminal 100 (information processing apparatus), a television terminal 200 (content reproduction apparatus), a service server 300 (information providing apparatus), and a device control server 400 (device control apparatus).

The portable terminal 100 serves as an information processing apparatus including portable telephone and PDA; and the television terminal 200 serves as a content reproduction apparatus including television terminal 200, personal computer, and STB. Description will be made below using a case of the portable terminal 100 and the television terminal 200 by way of example, but cases of the information processing apparatus other than the portable terminal 100, and the content reproduction apparatus other than the television terminal 200 can be similarly described.

The portable terminal 100 transmits and receives information with the service server 300 through a communication network, and transmits information to the television terminal 200 using a near field communication. The television terminal 200, the service server 300, and the device control server 400 transmit and receive information to each other through a communication network.

The portable terminal 100 acquires content and content information from the service server 300, and reproduces and displays the same. The portable terminal 100 registers the television terminal 200 in the cooperative processing system, and then indirectly controls the television terminal 200 by transmitting a processing request to the service server 300.

The television terminal 200 acquires contents from the content provider, and reproduces and displays the same. The television terminal 200 also displays the contents and the content information acquired from the service server 300, and the contents and the content information acquired from a content server 600 (second content providing device) connected through a communication network. The television terminal 200 is registered in the cooperative processing system by the portable terminal 100, and then indirectly controlled by the portable terminal 100 by the transmission of the processing request from the portable terminal 100 to the service server 300.

The service server 300 registers and manages the content information. The service server 300 provides to the portable terminal 100 and the television terminal 200 the content information being managed by the service server 300, as well as the contents and the content information acquired from a content server 500 (first content providing device) connected through a communication network.

The device control server 400 cooperates with the service server 300 to cause the portable terminal 100 to indirectly control the television terminal 200, thereby enabling the cooperative processing between the portable terminal 100 and the television terminal 200.

Contents are content entity that can be viewed using the portable terminal 100 and/or the television terminal 200 such as programs, photos, music, and products. Content information are information attached to the content such as title and briefing of the content entity, and are also referred to as program information, photo information, music information, and the like.

The portable terminal 100 registers the television terminal 200 in the cooperative processing system. The portable terminal 100 has a terminal ID unique to the portable terminal 100. The portable terminal 100 is given a device control ID used for the indirect control of the television terminal 200 from a specific service server 300, and the service server 300 stores the device control ID in association with the terminal ID of the portable terminal 100. The television terminal 200 is given a device ID used for the portable terminal 100 to indirectly control the television terminal 200 from a specific device control server 400, and the device control server 400 stores the device ID of the television terminal 200 in association with the device control ID to register the television terminal 200 in the cooperative processing system.

(Configuration of Cooperative Processing System)

Figure 2:
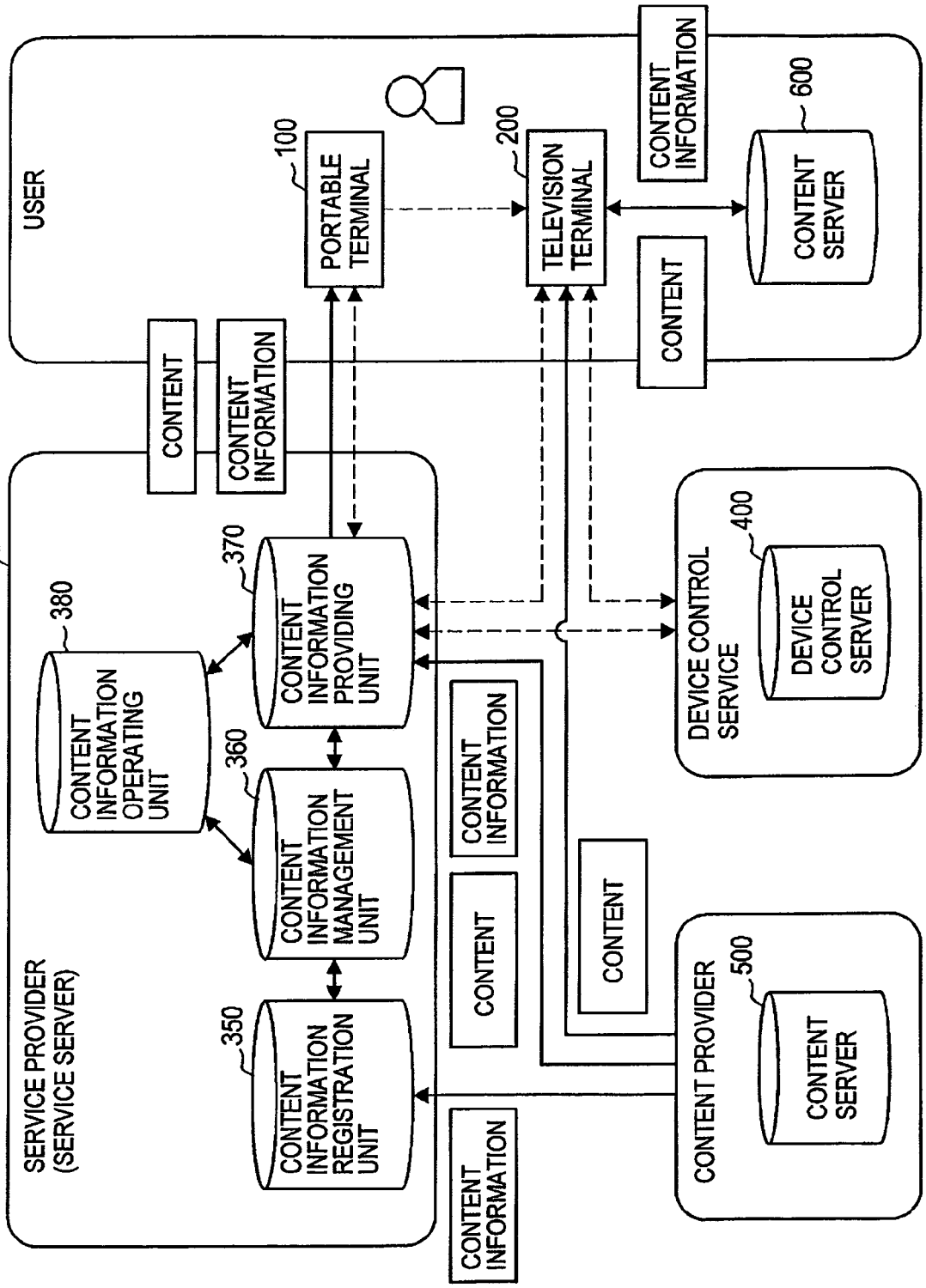
FIG. 2 is a view showing a configuration of the cooperative processing system.

FIG. 2 is a view showing a configuration of the cooperative processing system. As shown in FIG. 2, the cooperative processing system is configured to include the portable terminal 100, the television terminal 200, the service server 300, and the device control server 400. The cooperative processing system is configured to include at least one of each of the portable terminal 100, the television terminal 200, the service server 300, and the device control server 400. In FIG. 2, transmission and reception of contents and/or content information between the components of the cooperative processing system are indicated with a solid line arrow, and transmission and reception of other information such as the processing request are indicated with a broken line arrow.

The television terminal 200 is connected to the content server 600 managed by the user of the television terminal 200 such as home server and PVR through a LAN (Local Area Network) and the like. The content server 600 stores the contents and the content information managed by the user of the television terminal 200. When having a search process function on its own, the content server 600 extracts the contents and/or the content information adapted to the search condition based on the search condition received from the television terminal 200, and provides the extracted content and/or the content information to the television terminal 200. On the other hand, when not having a search process function on its own, the content server 600 provides to the television terminal 200 the contents and/or the content information extracted through the search process at the initiative of the television terminal 200. The television terminal 200 acquires, and reproduces and displays the content from the content provider through the broadcast service, the communication service, and the broadcast communication service, and selectively has a viewing/recording reservation function of the content.

The service server 300 is operated by a service provider providing various types of information services. The service server 300 is, for example, program information server that provides program information, photo information server that provides photo information, music information server that provides music information, and product information server that provides product information.

The service server 300 is configured to include a content information registration unit 350 for registering the content information provided from the content provider, a content information management unit 360 for managing the content information, a content information providing unit 370 for providing the content information, and a content information operation management unit 380 for operating the content information management unit 360 and the content information providing unit 370. The content information registration unit 350 also registers content information serving as so-called related information such as product and advertisement related to the content information other than the content information provided from the content provider, and can provide the same to the portable terminal 100 along with other content information.

The service server 300 is connected to the content server 500 operated by the content provider through the communication network. The content server 500 stores content managed by the content provider, and content information attached to the content. When having a search process function on its own, the content server 500 extracts the contents and/or the content information adapted to the search condition based on the search condition received from the service server 300, and provides the extracted content and/or the content information to the service server 300. When not having a search process function on its own, the content server 500 provides to the service server 300 the contents and/or the content information extracted through the search process at the initiative of the service server 300.

The device control server 400 is operated by a manufacturer of the television terminal 200 indirectly controlled by the portable terminal 100, or a service provider providing the cooperative processing service. The device control server 400 includes a device control server 400 for providing a cooperative processing service using a content reproduction apparatus manufactured by a manufacturer A, a device control server 400 for providing a cooperative processing service using a content reproduction apparatus manufactured by a manufacturer B, a device control server 400 for providing a cooperative processing service using a content reproduction apparatus manufactured by various manufacturers, and the like.

FIGS. 3 to 6 are block diagrams showing main function configurations of the portable terminal 100, the television terminal 200, the service server 300, and the device control server 400 configuring the cooperative processing system.

(Configuration of Portable Terminal 100)

Figure 3:
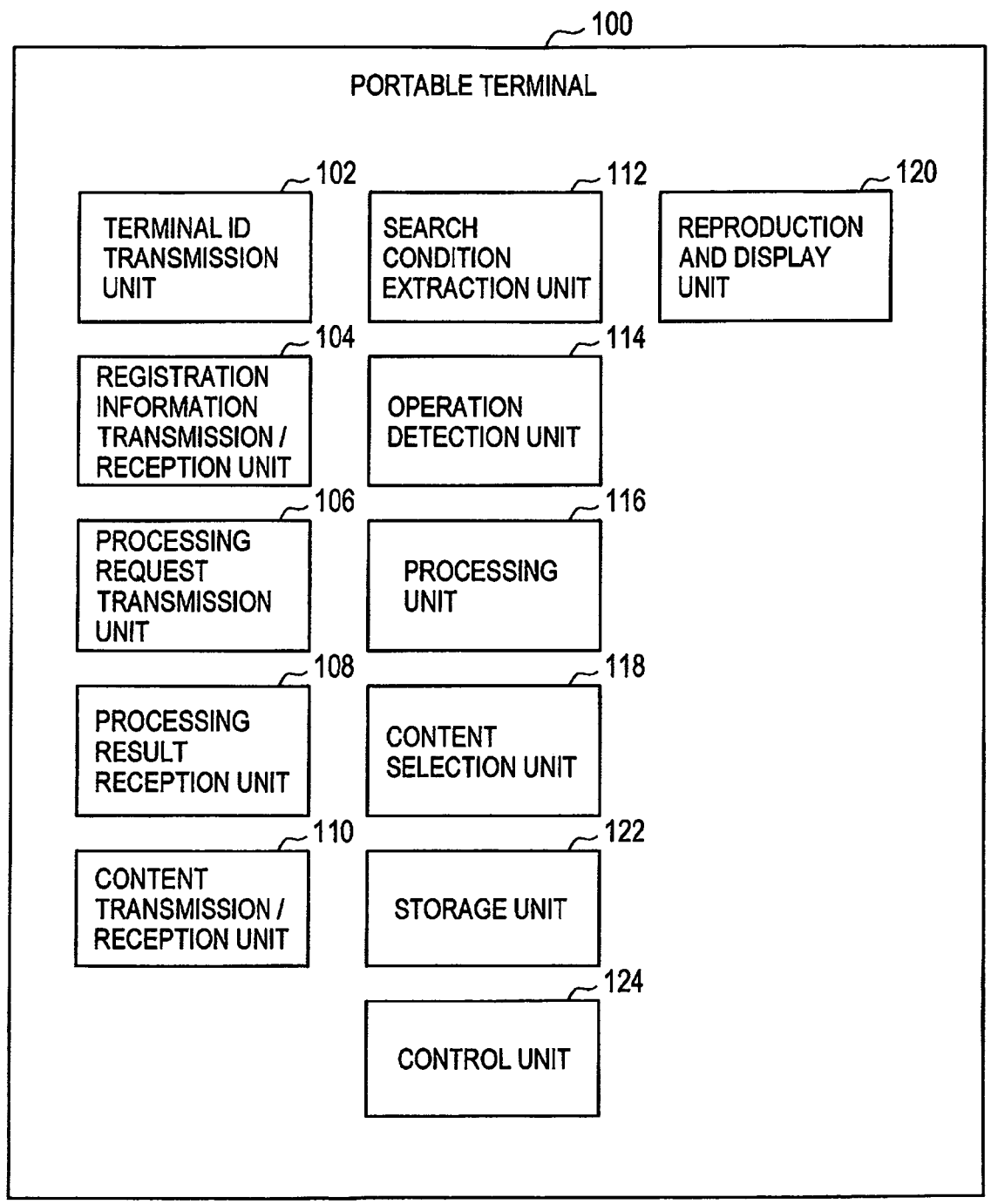
FIG. 3 is a block diagram showing a main function configuration of a portable terminal.

FIG. 3 is a block diagram showing a main function configuration of the portable terminal 100. As shown in FIG. 3, the portable terminal 100 is configured to include a terminal ID transmission unit 102, a registration information transmission/reception unit 104, a processing request transmission unit 106, a processing result reception unit 108, a content transmission/reception unit 110, a search condition extraction unit 112, an operation detection unit 114, a processing unit 116, a content selection unit 118, a reproduction and display unit 120, a storage unit 122, and a control unit 124. FIG. 3 particularly shows the main function configuration related to the function of the cooperative processing system.

The terminal ID transmission unit 102, the registration information transmission/reception unit 104, the processing request transmission unit 106, the processing result reception unit 108, and the content transmission/reception unit 110 are function units for transmitting and receiving various types of information between the television terminal 200 and the service server 300. The terminal ID transmission unit 102 transmits the terminal ID unique to the portable terminal 100 to the service server 300. The registration information transmission/reception unit 104 receives the registration information used for a registration process of the television terminal 200 from the service server 300, and transmits the same to the television terminal 200. The processing request transmission unit 106 transmits a processing request of various processing performed in cooperation with the television terminal 200 to the service server 300, and the processing result reception unit 108 receives the processing result of various processing from the service server 300. The content transmission/reception unit 110 transmits and receives contents and/or content information with the service server 300.

The search condition extraction unit 112 is a function unit for extracting information, which becomes the search condition, from the contents or the content information reproduced and displayed by the portable terminal 100 in the search process of the contents and the content information. The operation detection unit 114 is a function unit for detecting the operation applied on the portable terminal 100, and the processing unit 116 is a function unit for determining the processing request from the user according to the detected operation, and performing necessary processing. The content selection unit 118 is a function unit enabling the user to select the contents or the content information displayed on the television terminal 200 in the selection process of the content.

The reproduction and display unit 120 is a function unit for reproducing and displaying the contents and/or the content information. The storage unit 122 is a function unit for storing various data necessary for various processing by the portable terminal 100, programs for operating the portable terminal 100 as necessary, and the like. The control unit 124 is a function unit for controlling the function of the entire portable terminal 100 by controlling other components.

(Configuration of Television Terminal 200)

Figure 4:
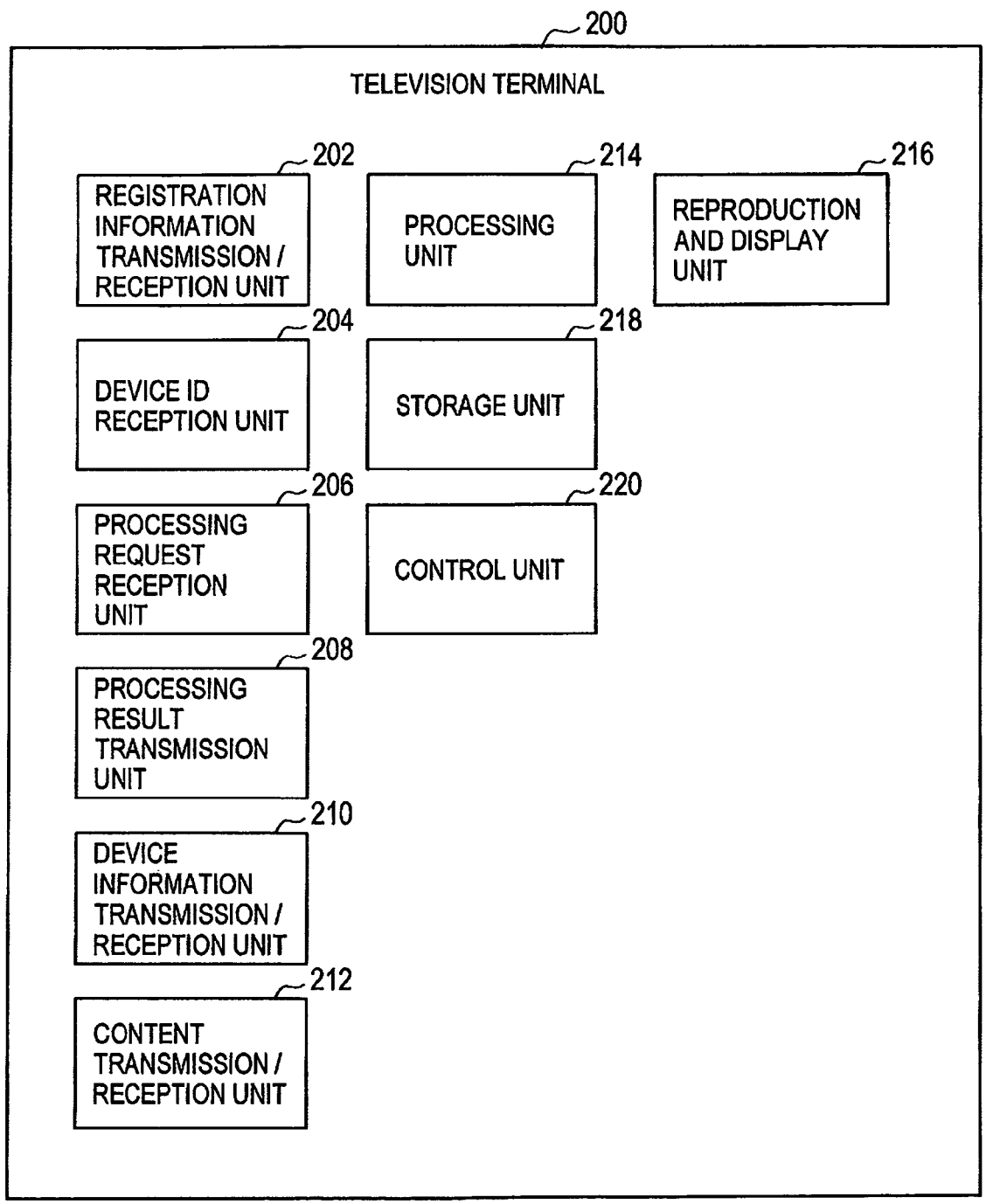
FIG. 4 is a block diagram showing a main function configuration of a television terminal.

FIG. 4 is a block diagram showing a main function configuration of the television terminal 200. As shown in FIG. 4, the television terminal 200 is configured to include a registration information transmission/reception unit 202, a device ID reception unit 204, a processing request reception unit 206, a processing result transmission unit 208, a device information transmission/reception unit 210, a content transmission/reception unit 212, a processing unit 214, a reproduction and display unit 216, a storage unit 218, and a control unit 220. FIG. 4 particularly shows the main function configuration related to the function of the cooperative processing system.

The registration information transmission/reception unit 202, the device ID reception unit 204, the processing request reception unit 206, the processing result transmission unit 208, the device information transmission/reception unit 210, and the content transmission reception unit 212 are function units for transmitting and receiving various types of information between the portable terminal 100 and the service server 300 and the device control server 400. The registration information transmission/reception unit 202 transmits and receives the registration information used for the registration process of the television terminal 200 between the portable terminal 100 and the device control server 400. The device ID reception unit 204 receives from the device control server 400 the device ID used for the portable terminal 100 to indirectly control the television terminal 200. The processing request reception unit 206 receives the processing request of various processing performed in cooperation with the portable terminal 100 from the service server 300, and the processing result transmission unit 208 transmits the processing result of various processing to the service server 300. The device information transmission/reception unit 210 transmits and receives device information used for various processing with the device control server 400. The content transmission/reception unit 212 transmits and receives contents and/or content information with the service server 300.

The processing unit 214 is a function unit for performing various processing in cooperation with the portable terminal 100 based on the processing request received from the service server 300. The reproduction and display unit 216 is a function unit for reproducing and displaying the contents and/or the content information. The storage unit 218 is a function unit for storing various data necessary for various processing by the television terminal 200, programs for operating the television terminal 200 as necessary, and the like. The control unit 220 is a function unit for controlling the function of the entire television terminal 200 by controlling other components.

(Configuration of Service Server 300)

Figure 5:
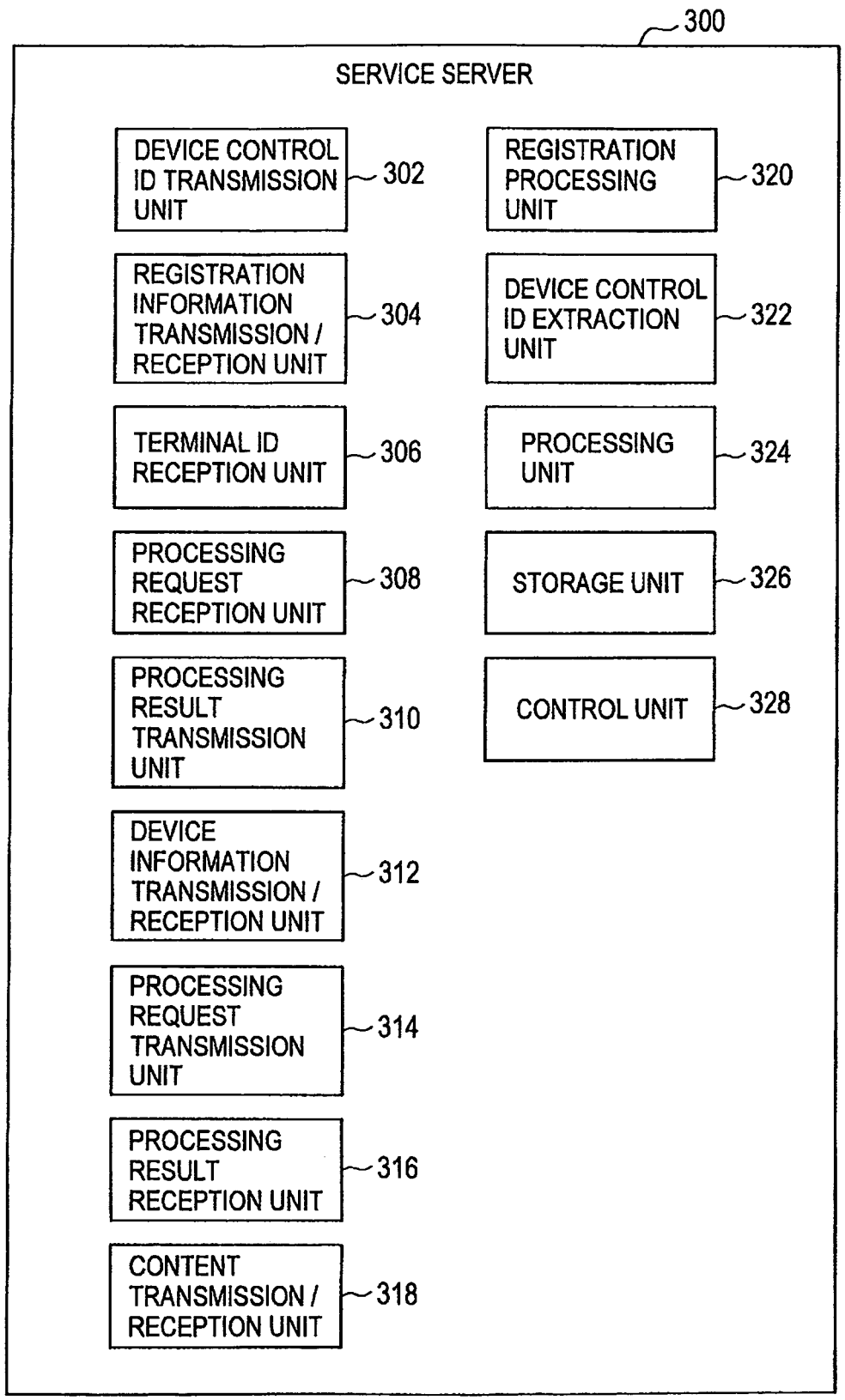
FIG. 5 is a block diagram showing a main function configuration of a service server.

FIG. 5 is a block diagram showing a main function configuration of the service server 300. As shown in FIG. 5, the service server 300 is configured to include a device control ID transmission unit 302, a registration information transmission/reception unit 304, a terminal ID reception unit 306, a processing request reception unit 308, a processing result transmission unit 310, an device information transmission/reception unit 312, a processing request transmission unit 314, a processing result reception unit 316, a content transmission/reception unit 318, a registration processing unit 320, a device control ID extraction unit 322, a processing unit 324, a storage unit 326, and a control unit 328. FIG. 5 particularly shows the main function configuration related to the function of the cooperative processing system.

The device control ID transmission unit 302, the registration information transmission/reception unit 304, the terminal ID reception unit 306, the processing request reception unit 308, the processing result transmission unit 310, the device information transmission/reception unit 312, the processing request transmission unit 314, the processing result reception unit 316, and the content transmission/reception unit 318 are function units for transmitting and receiving various types of information between the television terminal 200 and the device control server 400. The device control ID transmission unit 302 transmits the device control ID to the device control server 400. The registration information transmission/reception unit 304 receives the registration information used for the registration process of the television terminal 200 from the device control server 400, and transmits the same to the portable terminal 100.

The terminal ID reception unit 306 receives the terminal ID from the portable terminal 100. The processing request reception unit 308 receives the processing request of various processing performed in cooperation between the portable terminal 100 and the television terminal 200 from the portable terminal 100, and the processing result transmission unit 310 transmits the processing result of various processing to the portable terminal 100. The device information transmission/reception unit 312 transmits and receives the device control ID and access destination of the television terminal 200 with the device control server 400. The processing request transmission unit 314 transmits the processing request of various processing performed in cooperation between the portable terminal 100 and the television terminal 200 to the television terminal 200, and the processing result reception unit 316 receives the processing result of various processing from the television terminal 200. The content transmission/reception unit 318 transmits and receives contents and/or content information between the portable terminal 100 and the television terminal 200.

The registration processing unit 320 is a function unit for performing various processing for the registration process of the television terminal 200. The device control ID extraction unit 322 is a function unit for extracting the device control ID stored in association with the terminal ID based on the terminal ID. The processing unit 324 is a function unit for performing various processing performed between the portable terminal 100 and the television terminal 200. The storage unit 326 is a function unit for storing various data necessary for various processing by the service server 300, programs for operating the service server 300, and the like. The control unit 328 is a function unit for controlling the function of the entire service server 300 by controlling other components.

(Configuration of Device Control Server 400)

Figure 6:
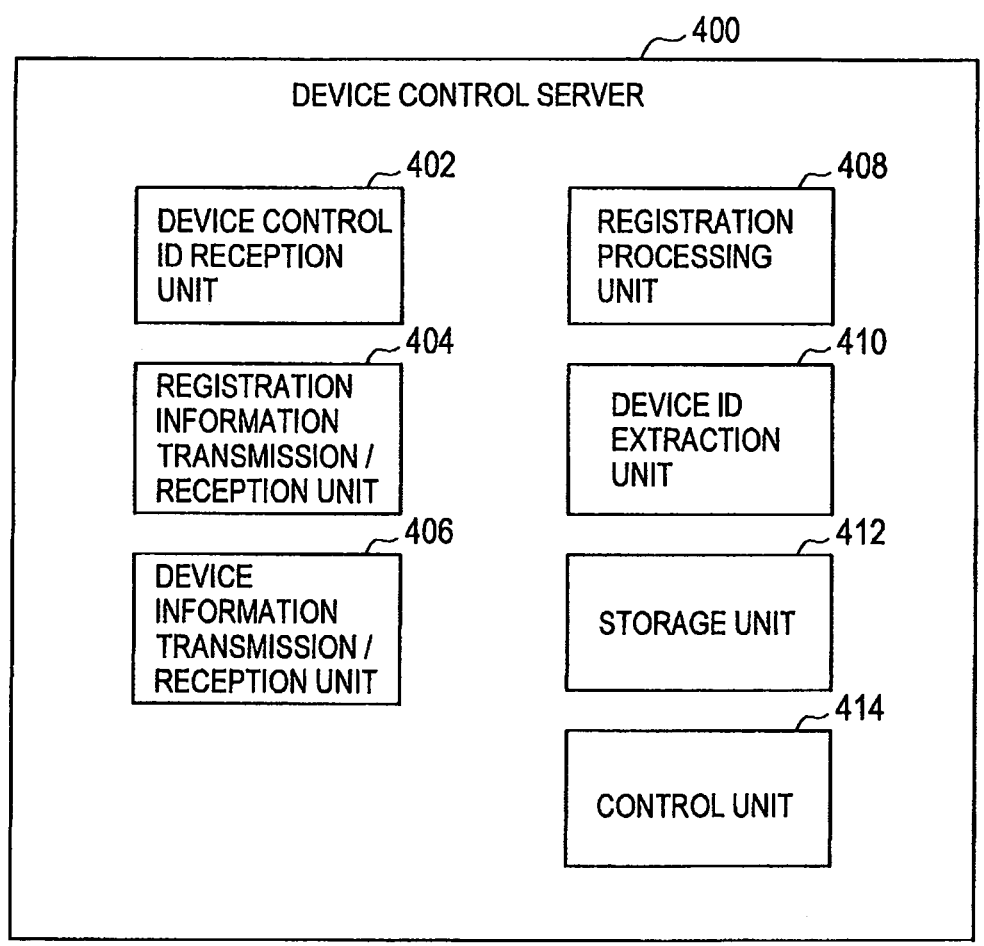
FIG. 6 is a block diagram showing a main function configuration of a device control server.

FIG. 6 is a block diagram showing a main function configuration of the device control server 400. As shown in FIG. 6, the device control server 400 is configured to include a device control ID reception unit 402, a registration information transmission/reception unit 404, a device information transmission/reception unit 406, a registration processing unit 408, a device ID extraction unit 410, a storage unit 412 and a control unit 414. FIG. 6 particularly shows the main function configuration related to the function of the cooperative processing system.

The device control ID reception unit 402, the registration information transmission/reception unit 404, and the device information transmission/reception unit 406 are function units for transmitting and receiving various types of information between the service server 300 and the television terminal 200. The device control ID reception unit 402 receives from the service server 300 the device control ID used for the portable terminal 100 to indirectly control the television terminal 200. The registration information transmission/reception unit 404 transmits and receives the registration information used for the registration process of the television terminal 200 between the television terminal 200 and the service server 300. The device information transmission/reception unit 406 transmits and receives the device information used for the various processing between the television terminal 200 and the service server 300.

The registration processing unit 408 is a function unit for performing various processing for the registration process of the television terminal 200. The device ID extraction unit 410 is a function unit for extracting the device ID stored in association with the device control ID. The storage unit 412 is a function unit for storing various data necessary for various processing by the device control server 400, programs for operating the device control server 400, and the like. The control unit 414 is a function unit for controlling the function of the entire device control server 400 by controlling other components.

Various processing by the cooperative processing system will now be described below with reference to FIGS. 7 to 16.
(Registration Process)

Figure 7:
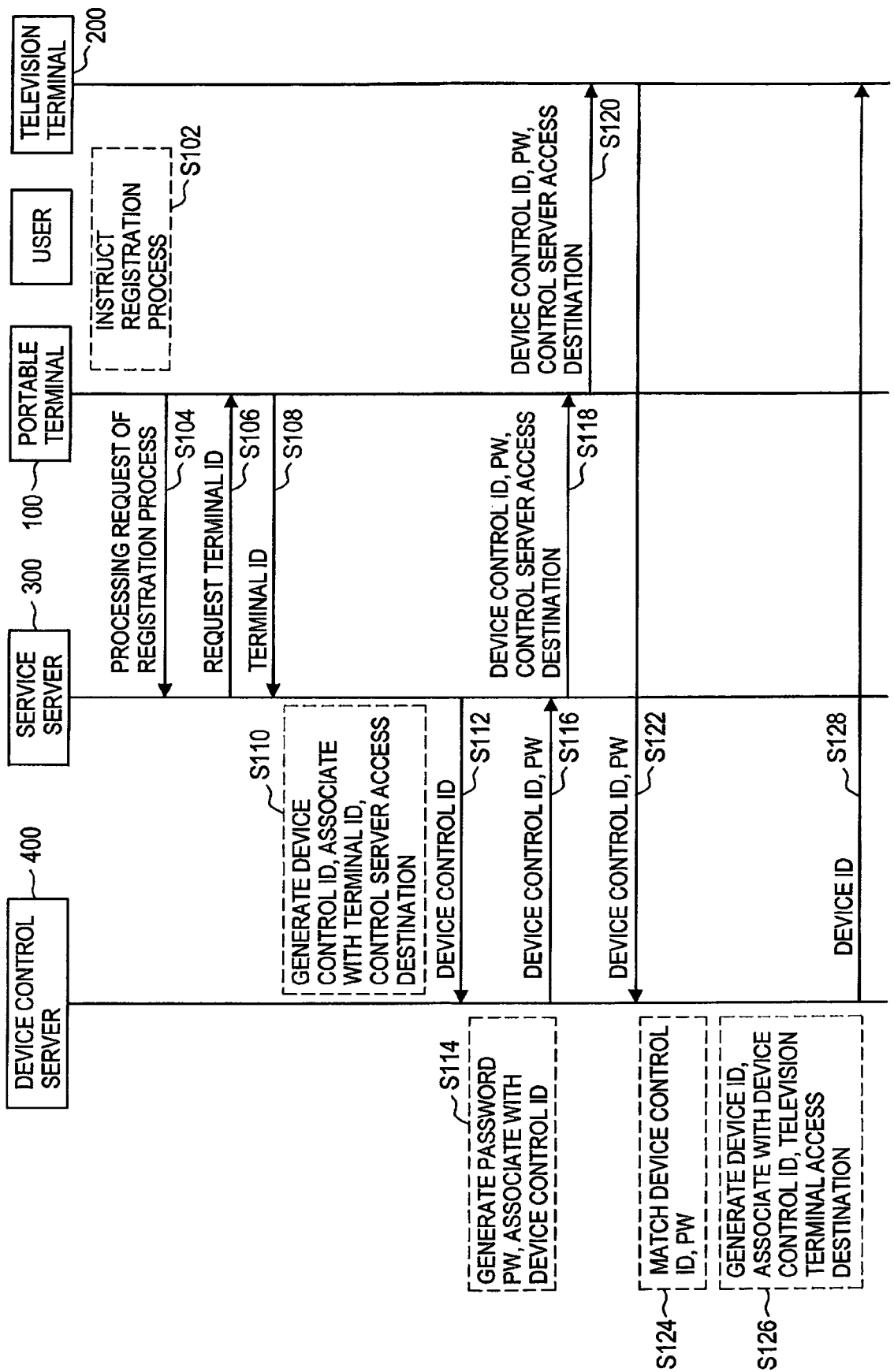
FIG. 7 is a sequence chart showing procedures of a registration process.

FIG. 7 is a sequence chart showing procedures of the registration process. The portable terminal 100 registers the television terminal 200 in the cooperative processing system through the following procedures.

When receiving instruction of the registration process from the user (step S102), the portable terminal 100 accesses a specific service server 300 selected by the user or set in advance, and transmits a processing request of the registration process (S104). When receiving the processing request, the service server 300 requests the portable terminal 100 to transmit the terminal ID unique to the portable terminal 100 such as the access destination on the communication network and the product number (S106), and the portable terminal 100 transmits its terminal ID to the service server 300 (S108). When receiving the terminal ID, the service server 300 generates the device control ID, and stores the device control ID in association with the access destination of the specific device control server 400 and the terminal ID (S110). Here, the specific device control server 400 is the device control server 400 for registering the television terminal 200 indirectly controlled by the portable terminal 100, and may be specified by the service server 300, or may be specified by the user of the portable terminal 100 in advance.

The service server 300 transmits the device control ID to the specific device control server 400 (S112). When receiving the device control ID, the device control server 400 generates a password used for the registration of the television terminal 200, stores the password in association with the device control ID (S114), and transmits the device control ID and the password to the service server 300 (S116). When receiving the device control ID and the password, the service server 300 transmits the device control ID, the password, and the access destination of the device control server 400 stored in association with the device control ID to the portable terminal 100 (S118). When receiving the device control ID, the password, and the access destination of the device control server 400, the portable terminal 100 transmits the received information to the television terminal 200 (S120).

When receiving the device control ID, the password, and the access destination of the device control server 400, the television terminal 200 accesses the device control server 400 for registering the television terminal 200 based on the access destination of the device control server 400, and transmits the device control ID, the password, and selectively the function information of the television terminal 200 (S122). Here, the function information of the television terminal 200 is information for specifying the function of the television terminal 200 such as presence of viewing/recording reservation function. When receiving the device control ID and the password, the device control server 400 matches the received device control ID and the password with the stored device control ID and the password (S124). If the match result is successful, the device control server 400 generates the device ID, and stores the device ID in association with the device control ID, the access destination of the television terminal 200, and selectively the function information of the television terminal 200 (S126) to thereby register the television terminal 200 in the cooperative processing system. The device control server 400 then transmits the device ID to the television terminal 200 (S128), and the television terminal 200 stores the device ID.

The terminal ID of one portable terminal 100 and the device IDs of the plurality of content reproduction apparatus can be associated, and the terminal IDs of the plurality of portable terminals 100 and the device ID of one content reproduction apparatus can be associated using the device control ID. The user can register the content reproduction apparatus in the plurality of service servers 300 and the plurality of device control servers 400 using the portable terminal 100.

Through the above procedures, the television terminal 200 is registered in the cooperative processing system by the portable terminal 100, and the portable terminal 100 can indirectly control the television terminal 200. Thus, the user can have the portable terminal 100 and the television terminal 200 cooperatively perform various processing described below using the portable terminal 100.
(Viewing/Recording Reservation Process)

Figure 8:
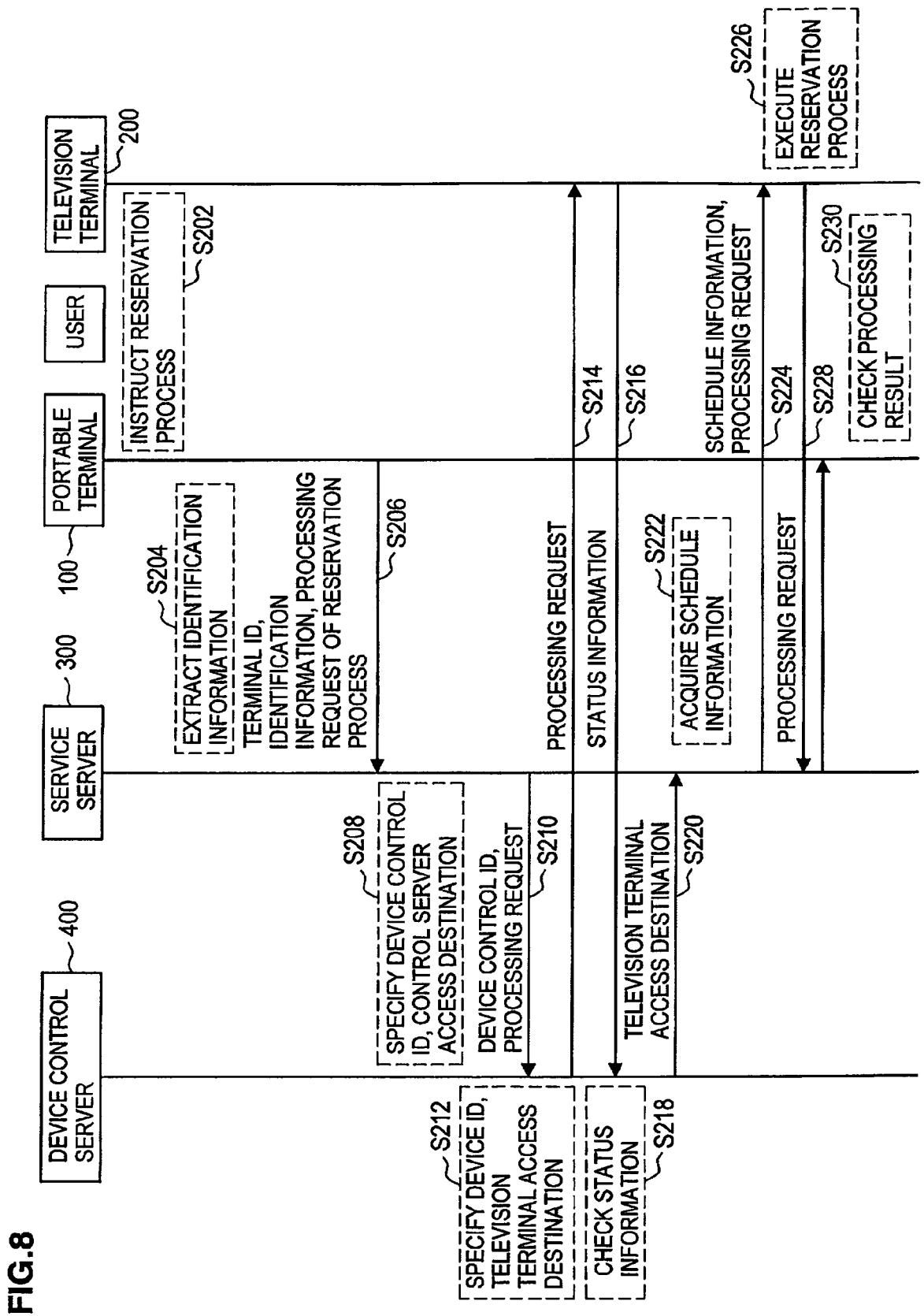
FIG. 8 is a sequence chart showing procedures of a viewing/recording reservation process.

FIG. 8 is a sequence chart showing procedures of the viewing/recording reservation process. The portable terminal 100 performs the viewing/recording reservation process in cooperation with the television terminal 200 through the following procedures. The viewing/recording reservation process is a process of making a viewing or recording reservation (video recording, audio recording, etc.) of a program content using the television terminal 200.

The portable terminal 100, when receiving instruction of the viewing/recording reservation process from the user while displaying content information attached to or related to a specific program content (S202), extracts identification information for specifying the program content such as program code and program name from the displayed content information (S204). The content information attached to or related to the program content to be subjected to the viewing/recording reservation process may be stored in advance in the portable terminal 100 by the user so as to be called out as necessary, or the portable terminal 100 can store in advance the content information that can be used for the process so that the content information can be presented as an alternative in the instruction of the viewing/recording reservation process.

After extracting the identification information, the portable terminal 100 transmits a processing request of the viewing/recording reservation process along with the terminal ID and the identification information to a specific service server 300 selected by the user or set in advance (S206). When receiving the processing request, the service server 300 specifies the device control ID and the access destination of the device control server 400 stored in association with the terminal ID based on the received terminal ID (S208). The service server 300 then accesses the specific device control server 400 based on the access destination of the device control server 400, and transmits the device control ID and the processing request (S210).

When receiving the processing request, the device control server 400 specifies the device ID and the access destination of the television terminal 200 stored in association with the device control ID based on the received device control ID (S212). The device control server 400 then accesses the television terminal 200 based on the access destination of the television terminal 200, and transmits a processing request (S214). When receiving the processing request, the television terminal 200 transmits status information representing execution possibility of the viewing/recording reservation process to the device control server 400 (S216).

The device control server 400 checks the status information (S218), and transmits the access destination of the television terminal 200 to the service server 300 if positive status information is received (S220). If negative status information is received or the status information may not be received even after elapse of a predetermined time, the device control server 400 notifies this fact to the service server 300. In this case, the service server 300 checks the presence of another device control ID stored in association with the terminal ID, and if the presence of another device control ID is confirmed, accesses the device control server 400 with the device ID associated with such device control ID. The service server 300 references the function information of the other content reproduction apparatus having the other device ID stored in association with the other device control ID, and transmits the processing request to the other content reproduction apparatus, similar to the case of the television terminal 200, if the other content reproduction apparatus has the viewing/recording reservation function. The service server 300 may notify this to the portable terminal 100 to seek confirmation of the access to the user of the portable terminal 100 before accessing the other content reproduction apparatus.

If positive status information is received from the other content reproduction apparatus, the device control server 400 transmits, in place of the television terminal 200, the access destination of the other content reproduction apparatus to the service server 300 as a target of indirect control by the portable terminal 100. If positive status information may not be received from either content reproduction apparatus having the viewing/recording reservation function, the service server 300 notifies this fact to the portable terminal 100, and notifies the user of the portable terminal 100 that the viewing/recording reservation process is non-executable. In the following, assume that positive status information is received from the television terminal 200.

When receiving the access destination of the television terminal 200, the service server 300 acquires schedule information (providing channel, providing date and time, etc.) of the program content based on the identification information received from the portable terminal 100 (S222). Here, the service server 300 extracts the schedule information based on the identification information from the program schedule table and the like therein, or acquires the schedule information from the content server 500 connected through the communication network. When acquiring the schedule information, the service server 300 accesses the television terminal 200 based on the received access destination of the television terminal 200, and transmits the processing request of the viewing/recording reservation process along with the schedule information (S224).

When receiving the processing request, the television terminal 200 executes the viewing/recording reservation process based on the received schedule information (S226). After the viewing/recording reservation process is completed, the television terminal 200 notifies the processing result to the portable terminal 100 via the service server 300 (S228). The user of the portable terminal 100 then can check the result of the viewing/recording reservation process (S230).

Through the above procedures, the user can have the portable terminal 100 and the television terminal 200 cooperatively perform the viewing/recording reservation process using the portable terminal 100.

(Search Process)

Figure 9:
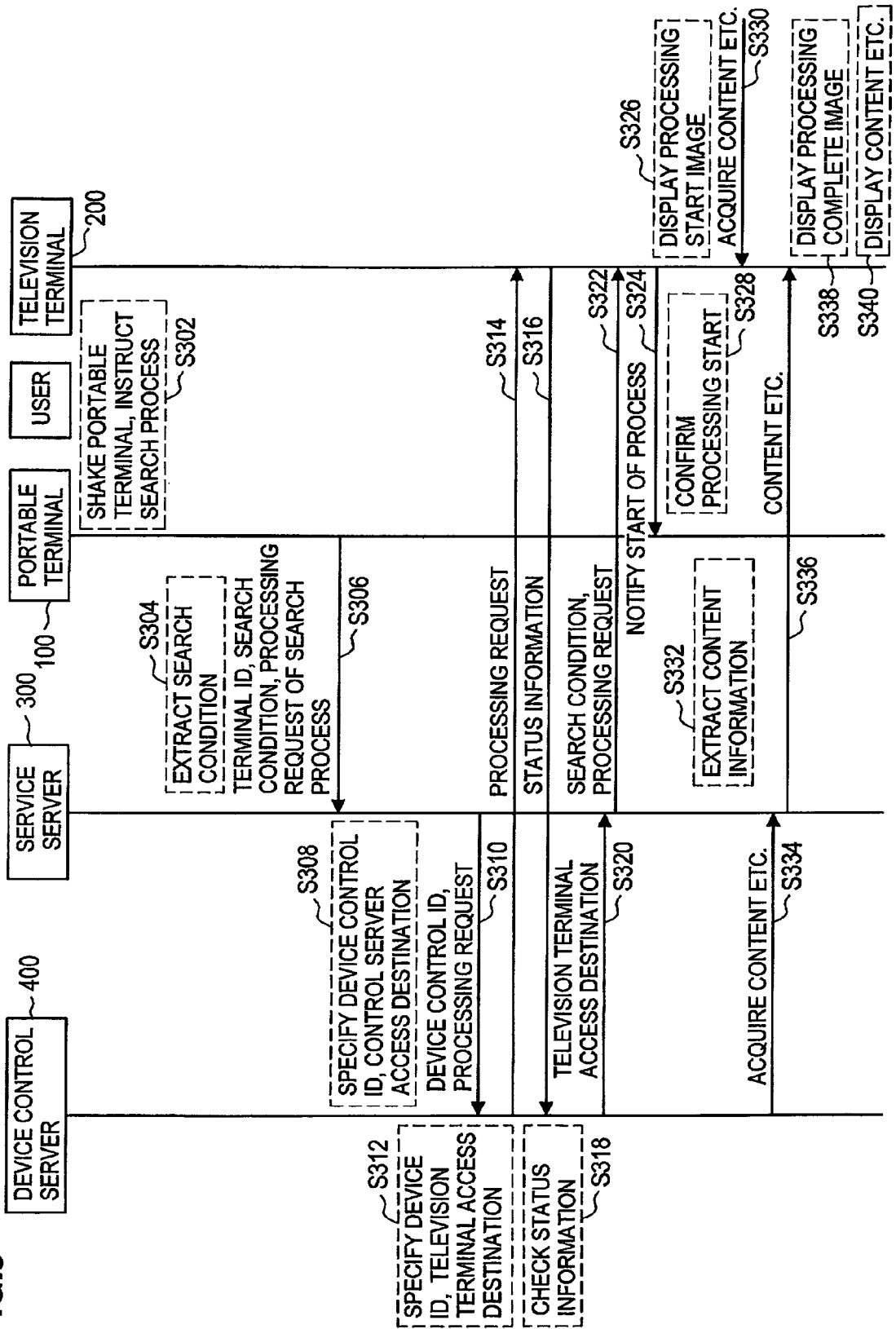
FIG. 9 is a sequence chart showing procedures of a search process.
Figure 10:
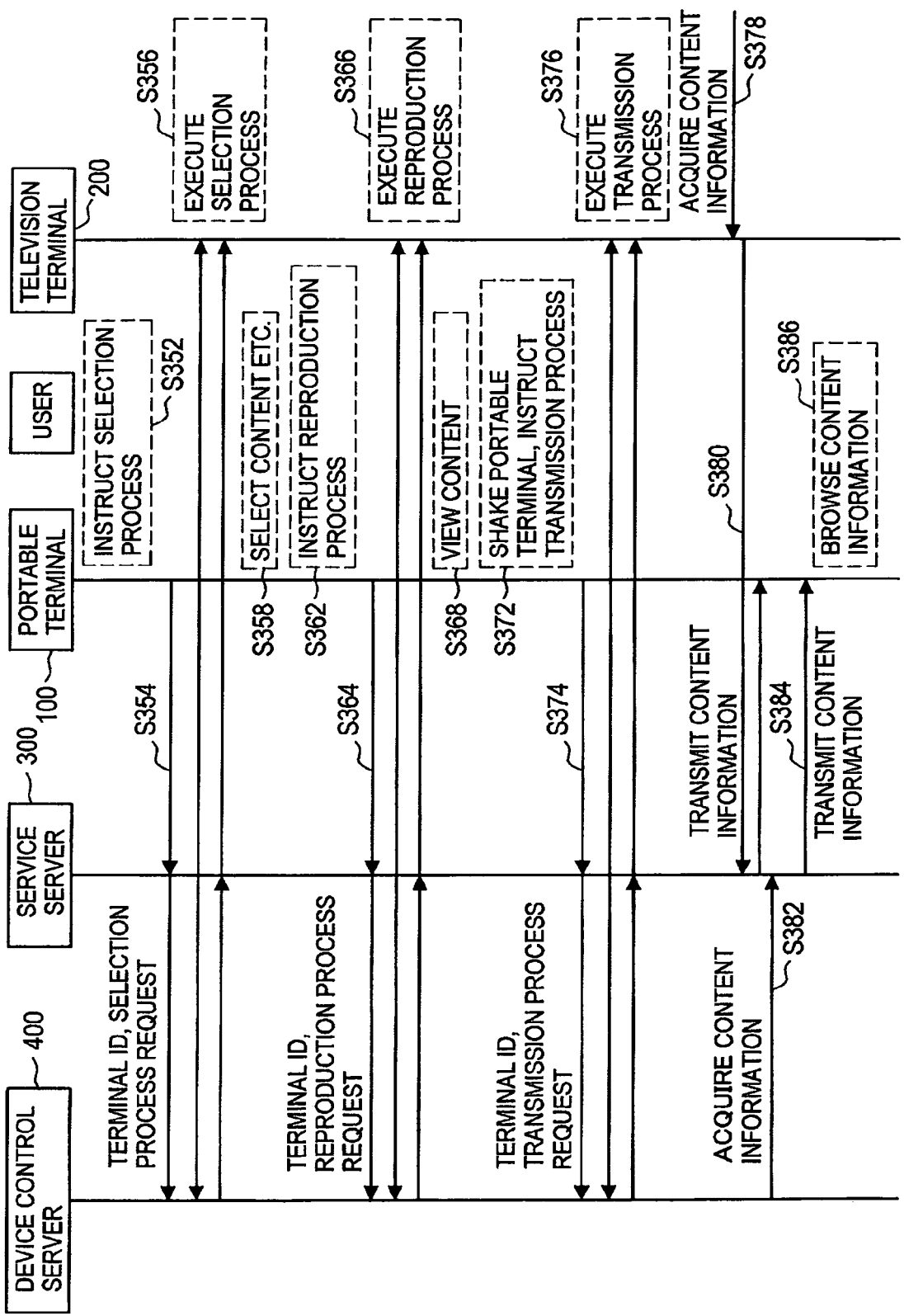
FIG. 10 is a sequence chart showing procedures of a selection process, a reproduction process, and a transmission process.

FIG. 9 is a sequence chart showing procedures of the search process, and FIG. 10 is a sequence chart showing procedures of the selection process, the reproduction process, and the transmission process. FIGS. 11 to 16 are views showing one example of image information displayed in a display region of the television terminal 200 in the search process and the selection process. The portable terminal 100 performs the search process, the reproduction process, and the transmission process in cooperation with the television terminal 200 through the following procedures.

When receiving instruction of the search process from the user while reproducing or displaying the content or the content information (S302), the portable terminal 100 extracts information that becomes the search condition from the content or the content information (S304). The user then performs a specific operation on the portable terminal 100 such as shaking the portable terminal 100 towards the television terminal 200 to instruct the search process to the portable terminal 100. In this case, the portable terminal 100 determines that the processing request of the search process is made by detecting the acceleration applied in the direction from the front surface side arranged with the display region to the rear surface side. The user thus can easily instruct the search process to the portable terminal 100. Not limited to the above-described operation, the portable terminal 100 is set in advance with a specific operation for instructing the search process.

The portable terminal 100 may have an operation setup function enabling the user to set in advance the specific operation for instructing various processing to the portable terminal 100. In this case, in the operation setup function, the user first selects a specific process, and then performs a specific operation on the portable terminal 100 such as shaking the portable terminal 100. When recognizing the specific operation, the portable terminal 100 notifies the same to the user, and confirms the user of the execution of the registration process of the operation setup, and then stores the specific process in correspondence to the specific operation when the execution of the registration process is confirmed. The portable terminal 100 thus can recognize the processing request of the specific process corresponding to the specific operation when the specific operation is performed after the registration process.

The information that becomes the search condition is extracted from the content information attached to the content reproduced and displayed in the form of video, image, music, and the like, or the content information being reproduced and displayed. On the other hand, if specific information is selected by the user, the information that becomes the search condition is extracted as such information. If specific information is not selected, the information that becomes the search condition is extracted as main information contained in the content information, where if a plurality of alternatives exists as the main information, one of the alternatives may be selected by the user. The portable terminal 100 transmits the reproduced and displayed content or the content information to the service server 300 to have the service server 300 extract the information that becomes the search condition. The information that becomes the search condition may be stored in the portable terminal 100 in advance by the user to be called out as necessary, or may be stored in advance by the portable terminal 100 to be presented as an alternative in the instruction of the search process by the user.

After extracting the search condition, the portable terminal 100 transmits the processing request of the search process along with the terminal ID and the search condition to the service server 300 selected by the user or set in advance (S306). When receiving the processing request, the service server 300 specifies the device control ID and the access destination of the device control server 400, similar to the case of the viewing/recording reservation process (S308). The service server 300 then transmits the device control ID and the processing request of the search process to a specific device control server 400 (S310).

When receiving the processing request, the device control server 400 specifies the device ID and the access destination of the television terminal 200, similar to the case of the viewing/recording reservation process (S312). The device control server 400 transmits the processing request to the television terminal 200 (S314), and the television terminal 200 transmits status information representing execution possibility of the search process to the device control server 400 (S316). The device control server 400 performs transmission and reception of the status information, and the selection process of the content reproduction apparatus with the television terminal 200 and selectively other content reproduction apparatus, similar to the case of the viewing/recording reservation process (S318). If positive status information is received from the specific content reproduction apparatus, the device control server 400 transmits the access destination of the content reproduction apparatus to the service server 300 (S320). In the following, assume that positive status information is received from the television terminal 200.

When receiving the access destination of the television terminal 200, the service server 300 accesses the television terminal 200 based on the access destination of the television terminal 200, and transmits the processing request of the search process along with the search condition received from the portable terminal 100 (S322). When receiving the processing request, the television terminal 200 notifies the start of the search process to the portable terminal 100 via the service server 300 (S324). With the notification of the start of the search process, the television terminal 200 displays information representing start and execution of the search process (S326).

Figure 11:
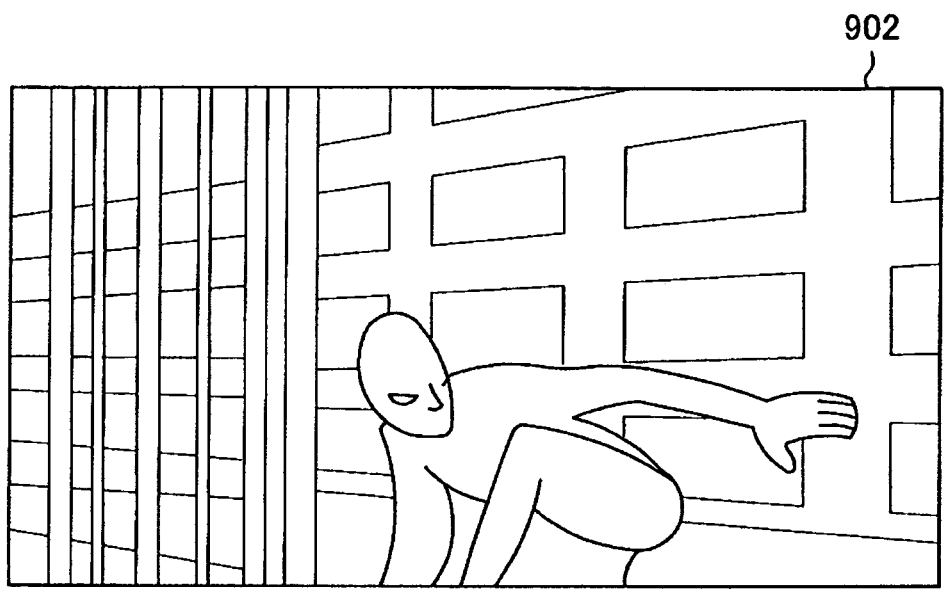
FIG. 11 is a view showing one example of a content displayed on the television terminal.
Figure 12:
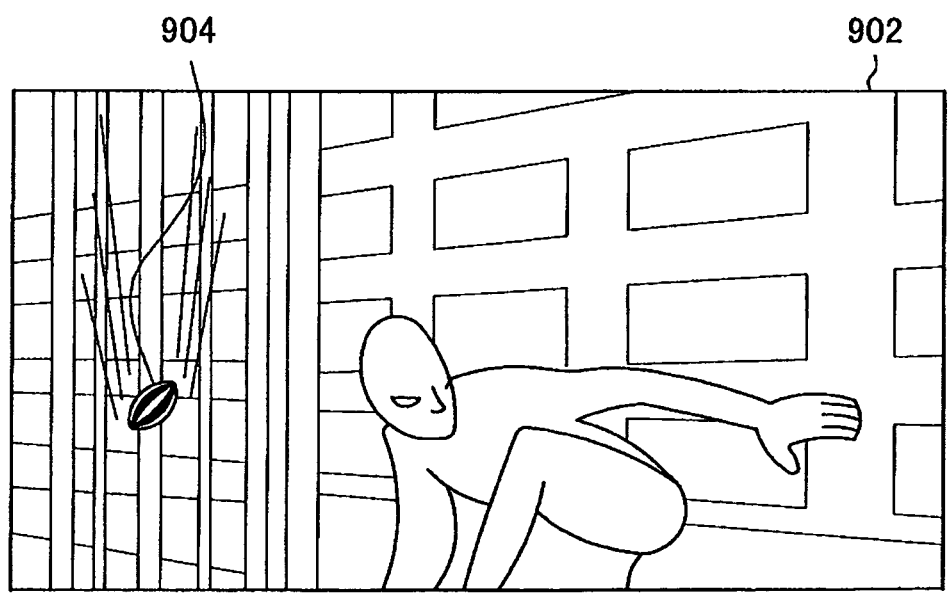
FIG. 12 is a view showing one example of information representing start of the search process.
Figure 13:
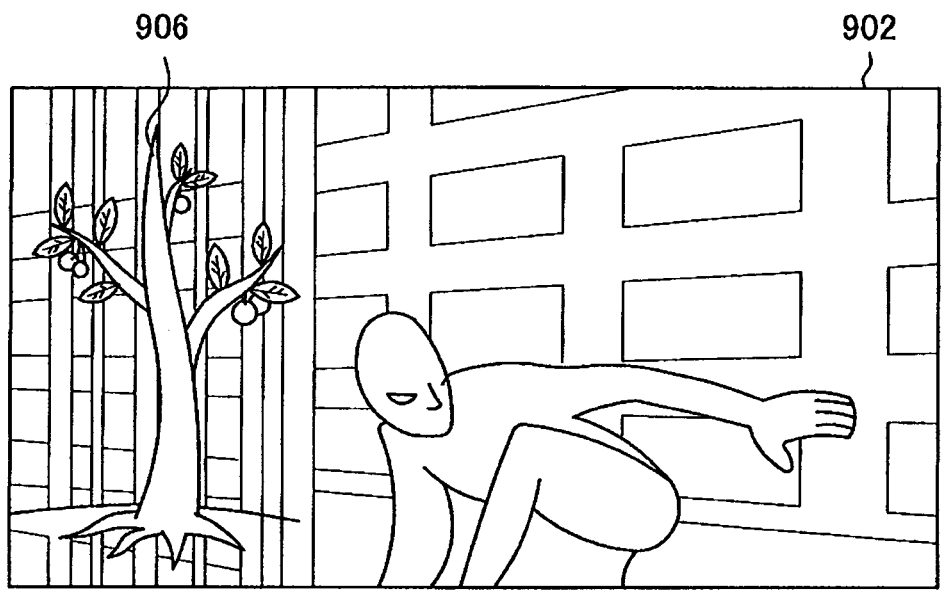
FIG. 13 is a view showing one example of information representing execution of the search process.

FIG. 11 shows one example of a content displayed on the television terminal 200 before the start of the search process, FIG. 12 shows one example of information showing the start of the search process, and FIG. 13 shows one example of information showing the execution of the search process.

When receiving the processing request of the search process from the service server 300 as a result of performing a specific operation on the portable terminal 100 while reproducing and displaying an image of content 902 as shown in FIG. 11, the television terminal 200 displays an image 904 as if a seed of a plant is thrown into one part of the display region as shown in FIG. 12. The television terminal 200 may output a sound effect of, for example, "splash". When starting the search process, the television terminal 200 displays an image 906 as if the seed thrown into one part of the display region grows and fruit blossoms, as shown in FIG. 13. Thus, the user of the portable terminal 100 can notify the start of the search process with respect to the portable terminal 100, and check the start and execution of the search process with the images displayed on the display region of the television terminal 200 (S328).

The television terminal 200 transmits the processing request of the search process along with the search condition to the content server 600 connected by LAN and the like. The content server 600 extracts the content and/or the content information adapted to the search condition from the content and the content information stored therein, and transmits the extracted content and/or the content information, or the list information thereof to the television terminal 200 (S330). The content server 600 provides the content and/or the content information extracted by the search process performed under the initiative of the television terminal 200 to the television terminal 200 if not including the search process function therein.

On the other hand, when receiving the processing request from the portable terminal 100, the service server 300 extracts the content information adapted to the search condition from the content information stored therein (S332). The service server 300 transmits the processing request of the search process along with the search condition to the content server 500 connected by the communication network. The content server 500 extracts the content and/or the content information adapted to the search condition from the content and the content information stored therein, and transmits the extracted content and/or the content information, or the list information thereof to the service terminal 300 (S334).

The service server 300 transmits the content information extracted by the service server 300, and the content and/or the content information extracted by the content server 500, or the list information thereof to the television terminal 200 (S336). The content server 500 provides the content and/or the content information extracted by the search process performed under the initiative of the service server 300 to the service server 300 if not including the search process function therein.

Figure 14:
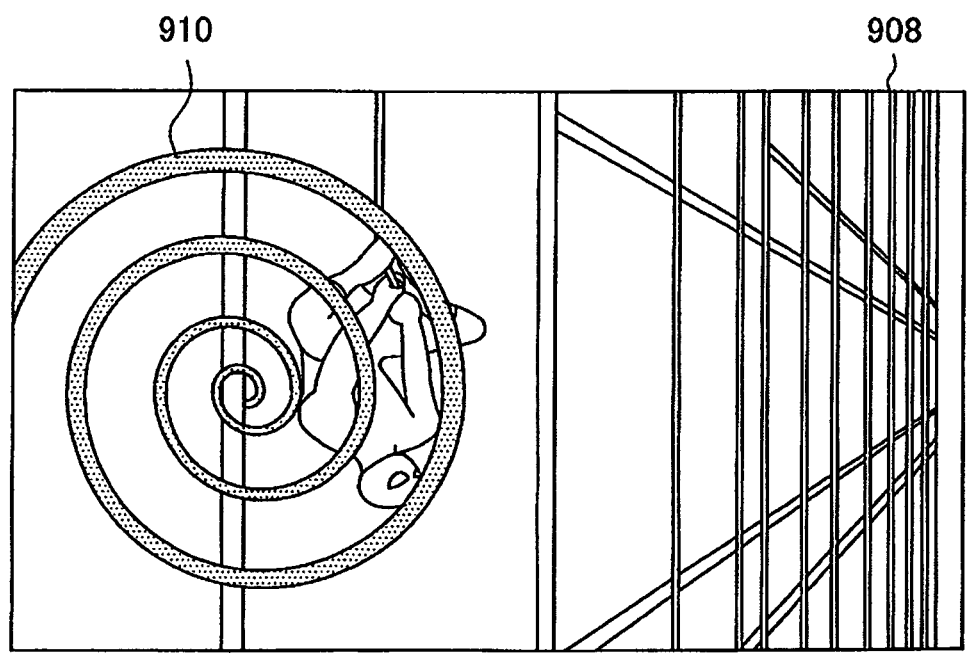
FIG. 14 is a view showing one example of information representing completion of the search process.

When receiving the content, the content information, and/or the list information thereof from the service server 300 and the content servers 500, 600, the television terminal 200 displays the information representing the completion of the search process (S338). FIG. 14 shows one example of the information representing the completion of the search process.

Figure 15:
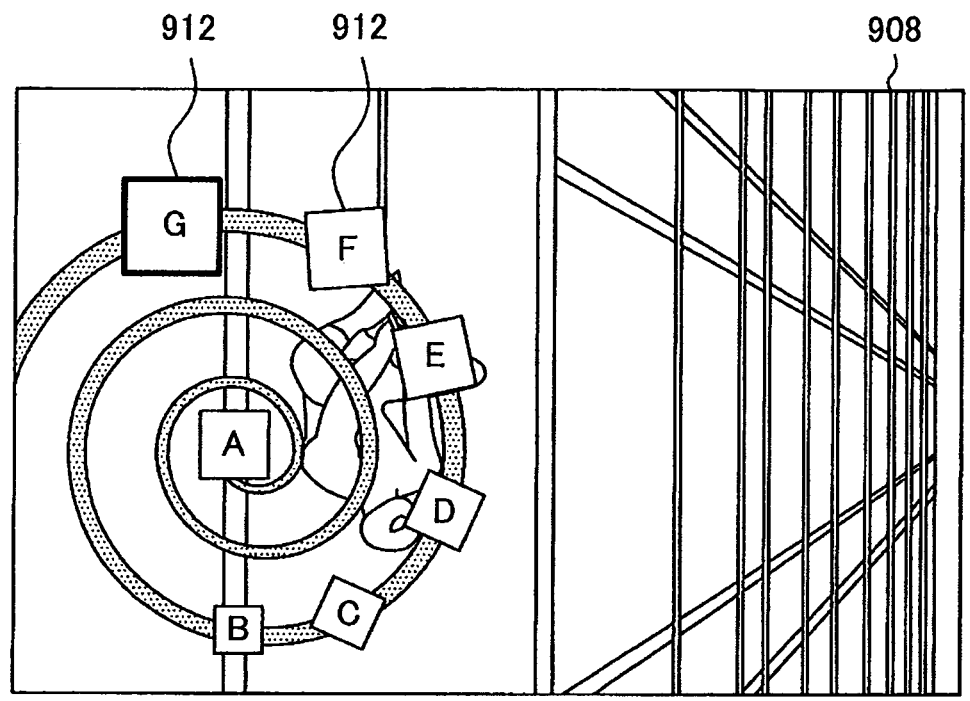
FIG. 15 is a view showing a display example in time of the selection process.
Figure 16:
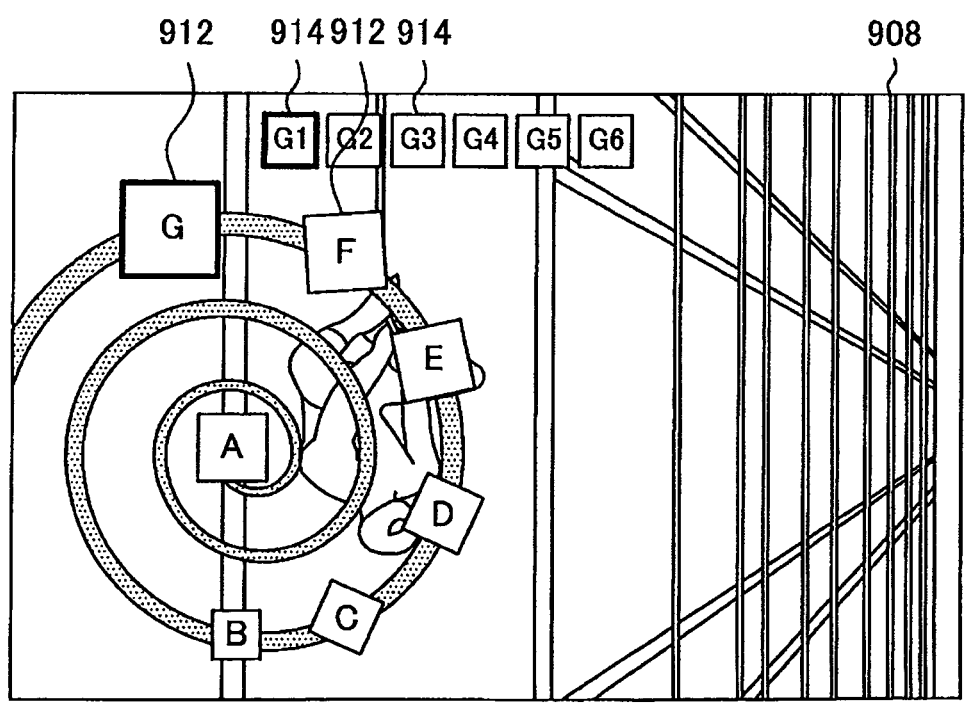
FIG. 16 is a view showing a display example in time of the selection process.

After the search process is completed, the television terminal 200 first displays a spiral-shaped image 910 in one part of the display region, as shown in FIG. 14. The television terminal 200 may display a spiral-shaped image with visual effect as if the spiral is oscillating. As shown in FIG. 15, the television terminal 200 displays an image of the received content and/or the content information arranged in a spiral-form on the spiral-shaped image (S340). The television terminal 200 groups the received content and/or the content information by category, and displays the content of the content and/or the content information contained in the group as a group icon 912. In the example shown in FIG. 15, group icons A to G are displayed.

Through the above procedures, the user can cause the portable terminal 100 and the television terminal 200 to cooperatively perform the search process of the content and the content information using the portable terminal 100. The user can seamlessly browse the search result of the content and/or the content information separately managed by the service server 300, the content provider, and the user.

(Selection Process, Reproduction Process, Transmission Process)

With the group icon 912 displayed on the television terminal 200, the user can operate the portable terminal 100 to select the group icon 912. Here, the operation information (S352) by the user is transmitted from the portable terminal 100 to the television terminal 200 via the service server 300 along with the processing request of the selection process (S354). When receiving the operation information, the television terminal 200 performs the selection process of the group icon 912 according to the operation information (S356). For instance, in the example shown in FIG. 15, the group icon G is selected.

When the group icon 912 is selected, the television terminal 200 displays a content icon 914 representing the content of the content and/or the content information represented by the selected group icon 912, as shown in FIG. 15. For instance, in the example shown in FIG. 16, the content icons G1 to G6 are displayed.

With the content icon 914 is displayed on the television terminal 200, the user operates the portable terminal 100 to select the content icon 914, and the television terminal 200 performs the selection process of the content icon 914 according to the operation information. For instance, in the example shown in FIG. 16, the content icon G1 is selected.

The user can instruct the reproduction process of the content to the portable terminal 100 with the content icon 914 representing the content selected in the display of the result of the search process (S362). Similar to the case of the operation information, the processing request of the reproduction process by the user is transmitted from the portable terminal 100 to the television terminal 200 via the service server 300 (S364). When receiving the processing request, the television terminal 200 performs the reproduction process of the content represented by the selected content icon 914 (S366). Here, if the content to reproduce is not acquired, the television terminal 200 performs the reproduction process after acquiring the content from the service server 300 or the content server 600.

Through the above procedures, the user can cause the portable terminal 100 and the television terminal 200 to cooperatively perform the reproduction process of the content using the portable terminal 100. The user can seamlessly view the content separately managed by the content provider and the user through the television terminal 200. The content thus can be viewed using the television terminal 200 having excellent reproduction and display function.

The user can instruct the transmission process of the content information to the portable terminal 100 with the content icon 914 representing the content information selected in the display of the result of the search process (S372). The user can instruct the transmission process to the portable terminal 100 by performing a specific operation on the portable terminal 100 such as shaking the portable terminal 100 towards the user. In this case, the portable terminal 100 determines that the processing request of the transmission process is made by detecting the acceleration applied in the direction from the rear surface side not arranged with the display region to the front surface side. The user thus can easily instruct the transmission process to the portable terminal 100. Not limited to the above-described operation, the portable terminal 100 is set in advance with a specific operation for instructing the transmission process.

Similar to the case of the operation information, the processing request by the user is transmitted from the portable terminal 100 to the television terminal 200 via the service server 300 (S374). When receiving the processing request, the television terminal 200 performs a process of transmitting the content information to the portable terminal 100 via the service server 300 (S376). Here, if the content information to be transmitted is not acquired from the content server 600, the television terminal 200 performs the transmission process (S380) after acquiring the content from the content server 600 (S378). On the other hand, if the content information to be transmitted is not acquired from the service server 300, the television terminal 200 notifies this fact to the service server 300, and the service server 300 transmits the content information to the portable terminal 100 (S384) (after acquiring from the content server 500 (S382) if the content information is not acquired from the content server 500).

Through the above procedures, the user can cause the portable terminal 100 and the television terminal 200 to cooperatively perform the transmission process of the content information using the portable terminal 100. The user can seamlessly browse the content information respectively managed by the service server 300, the content provider, and the user through the portable terminal 100. The content information then can be browsed regardless of time and place using the portable terminal 100 having excellent search and browse function.

As described above, according to the cooperative processing system of the present embodiment, the search result of the content and/or the content information managed by every service server 300 and the content servers 500, 600 can be seamlessly browsed by the user by performing the search process of the content and the content information by the portable terminal 100 and the television terminal 200 in cooperation. Consequently, the convenience of the user in time of content usage can be enhanced.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A content reproduction apparatus in a cooperative processing system, including an information processing apparatus, an information providing apparatus, a device control apparatus, and a content reproduction apparatus connectable through a communication network, for performing a cooperative process between the information processing apparatus and the content reproduction apparatus through the information providing apparatus storing a device control ID in association with a terminal ID unique to the information processing apparatus, and the device control apparatus storing a device ID of the content reproduction apparatus in association with the device control ID, wherein the information providing apparatus and the content reproduction apparatus are respectively connectable to first and second content providing devices for extracting and providing a content adapted to a search condition, and the content reproduction apparatus comprising:

a reproduction and display unit for reproducing and displaying the content and content information;

a processing request reception unit for receiving from the information providing apparatus, along with the search condition extracted from information reproduced and displayed by the information processing apparatus, a processing request of a search process for causing the information providing apparatus and the content reproduction apparatus to acquire content and/or content information adapted to the search condition respectively from the first and the second content providing devices and the content reproduction apparatus to display; and a processing unit for acquiring the content and/or the content information adapted to the search condition from the information providing apparatus and the second content providing device based on the processing request received from the information providing apparatus, and causing the reproduction and display unit to display, wherein the search process is initiated by shaking the information processing apparatus, wherein the processing unit causes the reproduction and display unit to display image information representing execution of the search process after causing the reproduction and display unit to display image information representing start of the search process when the processing request reception unit receives the processing request of the search process, and the processing unit causes the reproduction and display unit to display image information representing spiral when acquiring the content and/or the content information adapted to the search condition from the information providing apparatus and the second content providing device, and the reproduction and display unit to display the acquired content and/or the content information so as to be arranged in a spiral form on the image information representing spiral, and wherein the image information representing the start of the search process includes an image of a seed of a plant, and the image information representing the execution of the search process includes an image of a grown plant.

2. A content reproduction apparatus in a cooperative processing system, including an information processing apparatus, an information providing apparatus, a device control apparatus, and a content reproduction apparatus connectable through a communication network, for performing a cooperative process between the information processing apparatus and the content reproduction apparatus through the information providing apparatus storing a device control ID in association with a terminal ID unique to the information processing apparatus, and the device control apparatus storing a device ID of the content reproduction apparatus in association with the device control ID, wherein the information providing apparatus and the content reproduction apparatus are respectively connectable to first and second content providing devices for extracting and providing a content adapted to a search condition, and the content reproduction apparatus comprising:

a reproduction and display unit for reproducing and displaying the content and content information;

a processing request reception unit for receiving from the information providing apparatus, along with the search condition extracted from information reproduced and displayed by the information processing apparatus, a processing request of a search process for causing the information providing apparatus and the content reproduction apparatus to acquire content and/or content information adapted to the search condition respectively from the first and the second content providing devices and the content reproduction apparatus to display; and a processing unit for acquiring the content and/or the content information adapted to the search condition from the information providing apparatus and the second content providing device based on the processing request received from the information providing apparatus, and causing the reproduction and display unit to display, wherein the processing unit causes the reproduction and display unit to display image information representing execution of the search process after causing the reproduction and display unit to display image information representing start of the search process when the processing request reception unit receives the processing request of the search process, and the processing unit causes the reproduction and display unit to display image information representing spiral when acquiring the content and/or the content information adapted to the search condition from the information providing apparatus and the second content providing device, and the reproduction and display unit to display the acquired content and/or the content information so as to be arranged in a spiral form on the image information representing spiral, and wherein the image information representing the start of the search process includes an image of a seed of a plant, and the image information representing the execution of the search process includes an image of a grown plant.

* * * * *